(12) United States Patent
Hinson

(10) Patent No.: US 9,389,708 B2
(45) Date of Patent: Jul. 12, 2016

(54) ACTIVE STYLUS WITH FORCE SENSOR

(71) Applicant: Nigel Hinson, Lymington (GB)

(72) Inventor: Nigel Hinson, Lymington (GB)

(73) Assignee: Atmel Corporation, San Jose, CA (US)

( * ) Notice: Subject to any disclaimer, the term of this patent is extended or adjusted under 35 U.S.C. 154(b) by 92 days.

(21) Appl. No.: 14/272,882

(22) Filed: May 8, 2014

(65) Prior Publication Data

US 2015/0324018 A1 Nov. 12, 2015

(51) Int. Cl.
*G06F 3/0354* (2013.01)

(52) U.S. Cl.
CPC .................................. *G06F 3/03545* (2013.01)

(58) Field of Classification Search
CPC ............ G06F 3/03545; G06F 3/04883; G06F 3/0317; G06F 3/0383; G06K 9/222; G06K 9/24
USPC .................................................. 345/156–184
See application file for complete search history.

(56) References Cited

U.S. PATENT DOCUMENTS

| | | | |
|---|---|---|---|
| 5,888,007 A * | 3/1999 | Nicoll ................... | B43K 5/1845 401/148 |
| 6,027,272 A * | 2/2000 | Spencer ................. | B43K 1/086 401/152 |
| 6,727,439 B2 * | 4/2004 | Chao .................... | G06F 3/03545 178/19.01 |
| 6,985,138 B2 * | 1/2006 | Charlier ................ | G06F 3/0312 178/19.01 |
| 7,202,862 B1 * | 4/2007 | Palay ................... | G06F 3/03545 178/18.01 |
| 7,657,128 B2 | 2/2010 | Silverbrook | |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,339,250 B2 * | 12/2012 | Je .......................... | G06F 3/016 340/4.12 |
| 8,360,669 B2 * | 1/2013 | Underwood .......... | G06F 3/0317 345/179 |
| 8,963,890 B2 * | 2/2015 | Raif ..................... | G06F 3/03545 345/156 |
| 9,229,542 B2 * | 1/2016 | Krete ................... | G06F 3/03545 |
| 2005/0030297 A1 * | 2/2005 | Burstrom ............. | G06F 3/03545 345/179 |
| 2006/0181525 A1 * | 8/2006 | Larsen ................. | G06F 3/03545 345/179 |

(Continued)

FOREIGN PATENT DOCUMENTS

WO WO 2012/129247 A2 9/2012

OTHER PUBLICATIONS

U.S. Appl. No. 61/454,936, filed Mar. 21, 2011, Myers.

(Continued)

*Primary Examiner* — Amare Mengistu
*Assistant Examiner* — Sarvesh J Nadkarni
(74) *Attorney, Agent, or Firm* — Baker Botts L.L.P.

(57) ABSTRACT

In one embodiment, an active stylus includes one or more computer-readable non-transitory storage media embodying logic for wirelessly communicating with a device through a touch sensor of the device. The active stylus also includes a tip configured to receive an applied force and a force sensor configured to receive an inverse transferred force from a force-transfer element. The force-transfer element is mechanically coupled to the tip and configured to apply the inverse transferred force to the force sensor. The inverse transferred force is inversely correlated with the applied force when the applied force is less than a threshold force.

20 Claims, 12 Drawing Sheets

(56) References Cited

U.S. PATENT DOCUMENTS

| | | | |
|---|---|---|---|
| 2007/0014490 A1* | 1/2007 | Silverbrook | B41J 2/17503 382/313 |
| 2007/0025805 A1* | 2/2007 | Lapstun | B43K 7/005 401/195 |
| 2007/0139374 A1* | 6/2007 | Harley | G06F 1/1626 345/157 |
| 2007/0146348 A1* | 6/2007 | Villain | G06F 3/011 345/173 |
| 2007/0195068 A1* | 8/2007 | Kable | G06F 3/03545 345/179 |
| 2008/0165162 A1* | 7/2008 | Zloter | G06F 3/0304 345/179 |
| 2008/0198133 A1* | 8/2008 | Chen | G06F 3/03546 345/166 |
| 2008/0309635 A1 | 12/2008 | Matsuo | |
| 2009/0078476 A1* | 3/2009 | Rimon | G06F 3/03545 178/18.03 |
| 2009/0315854 A1 | 12/2009 | Matsuo | |
| 2011/0162444 A1* | 7/2011 | Yamamoto | G01B 5/28 73/105 |
| 2011/0304577 A1* | 12/2011 | Brown | G06F 3/03545 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0280947 A1* | 11/2012 | Weaver | G06F 3/03545 345/179 |
| 2013/0076612 A1 | 3/2013 | Myers | |
| 2013/0106725 A1* | 5/2013 | Bakken | G06F 3/033 345/173 |
| 2014/0300585 A1* | 10/2014 | Dowd | G06F 3/0416 345/179 |
| 2015/0070330 A1* | 3/2015 | Stern | G06F 3/03545 345/179 |
| 2015/0286310 A1* | 10/2015 | Chang | G06F 3/044 345/174 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

ACTIVE STYLUS WITH FORCE SENSOR

TECHNICAL FIELD

This disclosure generally relates to active styluses.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
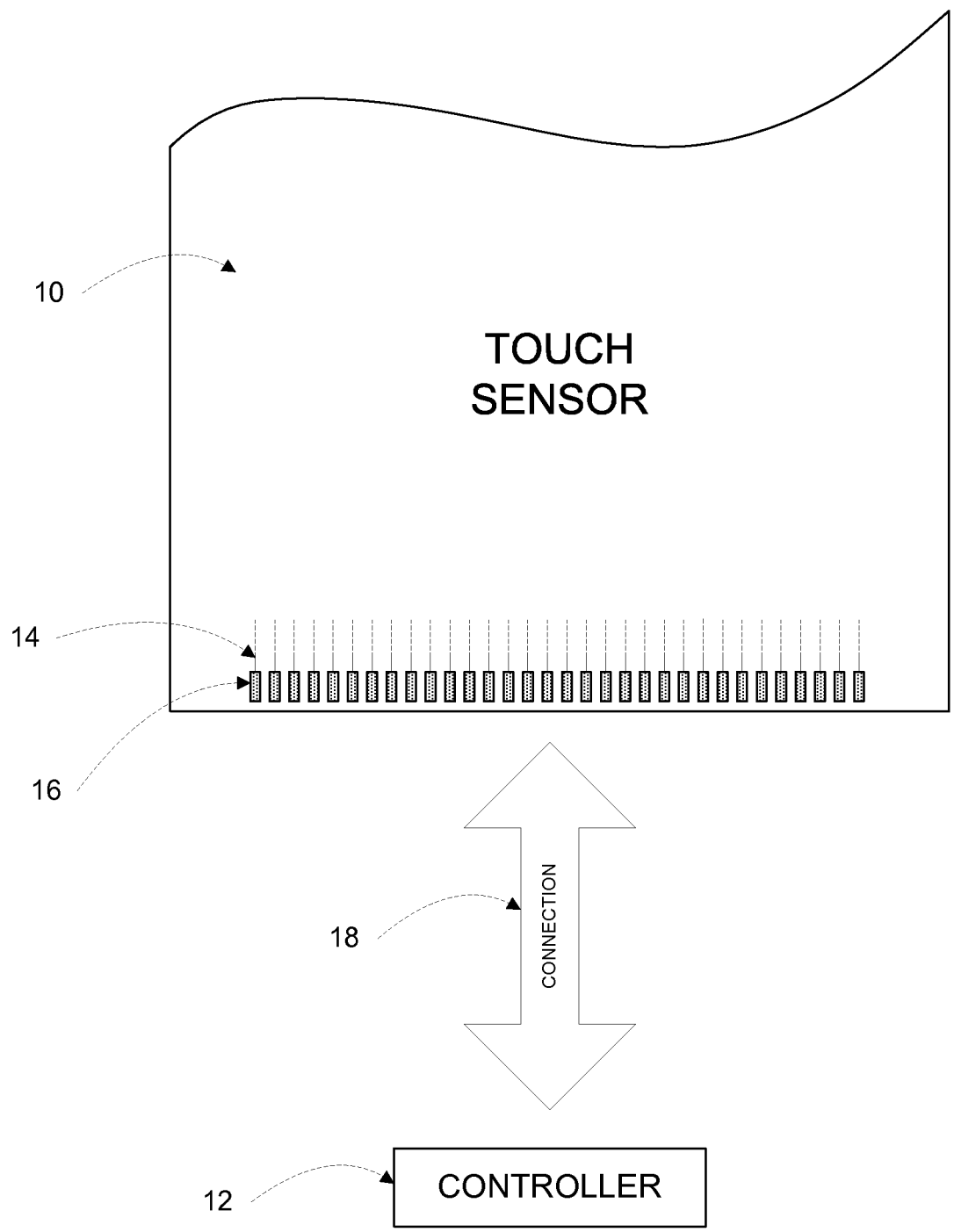
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 1% to approximately 10% of the area of its shape in a hatched, mesh, or other suitable pattern. Herein, reference to FLM encompasses such material, where appropriate. In particular embodiments, the percentage of FLM that covers a particular area may be referred to as a metal density. The fine lines of conductive material may be opaque or substantially reflective, and in particular embodiments, the combined optical transmissivity of electrodes formed using a conductive mesh may be approximately 90% or higher, ignoring a reduction in transmittance due to other factors such as the substrate material. Thus, the contribution of the fine lines of conductive material to the attenuation of light through the conductive mesh may be within a range of approximately 1% to approximately 10%. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection. Additionally, when overlaid over a display, one or more micro-features of the touch sensor (e.g., a touch-sensor mesh pattern, as described below) may, at least in part, determine an amount or a characteristic of a moiré-pattern effect exhibited by the touch sensor-display combination. In particular embodiments, a moiré pattern refers to a secondary and visually evident superimposed pattern that can result from a touch-sensor mesh pattern being overlaid over a repeating pixel pattern of a display. A moiré pattern may result in a waviness or a periodic spatial variation in the brightness of an image produced by a display. In particular embodiments, certain touch-sensor mesh patterns may exhibit a reduced amount of brightness variation associated with moiré-pattern effects. In particular embodiments, the reduction of moiré-pattern effects associated with a touch-sensor mesh pattern may be referred to as an improvement in optical performance of the mesh pattern.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 $\mu$m or less. As another example, the conductive material of tracks 14 may be silver or silver-based and have a width of approximately 100 $\mu$m or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
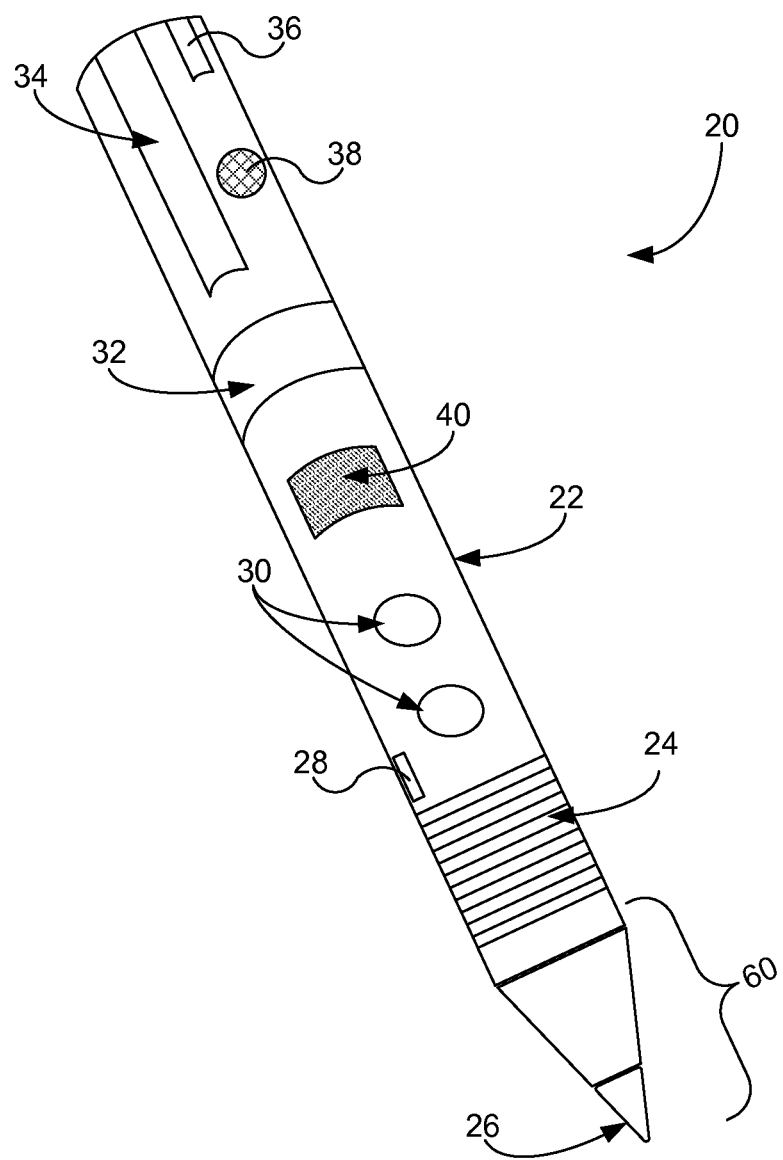
FIG. 2 illustrates an example active stylus exterior.

FIG. 2 illustrates an example exterior of an example active stylus 20, which may be used in conjunction with touch sensor 10 of FIG. 1. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may be any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device.

Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using an FPC.

Active stylus 20 may have one or more components configured to provide feedback to or accept feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or an electrophoretic display. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionality. For example and not by way of limitation, dragging a finger across modified surface area 40 may initiate an interaction, such as data transfer, between active stylus 20 and a device.

One or more components of active stylus 20 may be configured to communicate data between active stylus 20 and a device. In particular embodiments, active stylus 20 may have a tip region 60 located at an end of active stylus 20, and tip region 60 may include one or more tips 26 or nibs. In particular embodiments, tip region 60 or tip 26 may include one or more electrodes for wirelessly receiving or transmitting signals between active stylus 20 and one or more devices or other active styluses. In particular embodiments, tip region 60 may include one or more transmit electrodes or one or more receive electrodes. By way of example and without limitation, the electrodes of active stylus 20 may reside on outer body 22 of active stylus, in active-stylus tip 26 or tip region 60, or on or in any other suitable part of active stylus 20. Tip 26 may be made of any suitable material, such as a conductive material, an insulating or non-conductive material, or any suitable combination of conductive and non-conductive materials. Tip 26 may have any suitable dimensions, such as, for example, a diameter of 1 mm or less at its terminal end.

Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
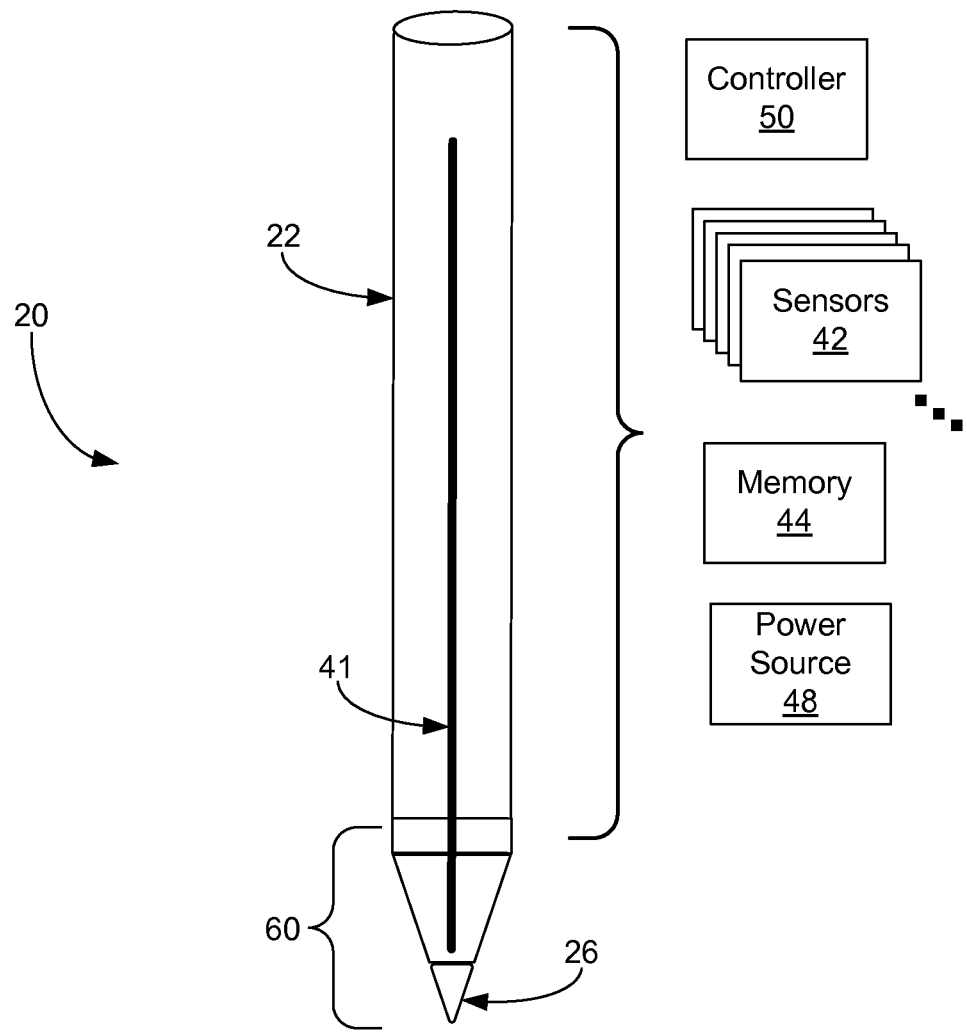
FIG. 3 illustrates an example active stylus interior.

FIG. 3 illustrates example internal components of an example active stylus 20. Active stylus 20 includes one or more components, such as a controller 50, sensors 42, memory 44, or power source 48. In particular embodiments, one or more components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low-energy data transmission or modulation link, such as, for example and without limitation, via a radio frequency (RF) communication link. In this case, active stylus 20 includes a RF device for transmitting data over the RF link.

Controller 50 may be a microcontroller or any other type of computing device or processor suitable for controlling the operation of active stylus 20. Controller 50 may be one or more ICs—such as, for example, general-purpose microprocessors, microcontrollers, programmable logic devices (PLDs), programmable logic arrays (PLAs), or ASICs. Controller 50 may include a processor unit, a drive unit, a sense unit, and a storage unit. In particular embodiments, a processor unit in controller 50 may control the operation of electrodes in active stylus 20, either via drive or sense units or directly. The drive unit may supply signals to one or more electrodes of tip 26 through conduit 41, which may be referred to as center shaft 41. In particular embodiments, conduit 41 may provide at least a portion of an electrical connection between controller 50 and one or more electrodes or sensors located at or near tip 26. In particular embodiments, conduit 41 may include electrical wiring, an FPC, a section of an FPC, a printed-circuit board (PCB), any combination of wiring, FPC, or PCB, or any suitable means for coupling an electrical line or signal between electrical devices or components. The drive unit may also supply signals to control or drive sensors 42 or one or more external components of active stylus 20. In particular embodiments, the drive unit of active stylus 20 may be configured to transmit a signal that may be detected by electrodes of touch sensor 10. As an example and not by way of limitation, the drive unit of active stylus 20 may include a voltage pump or a switch, such that the voltage pump may generate a high-voltage signal, or the switch may toggle the potential of one or more electrodes of tip 26 between zero voltage and one or more pre-determined voltage levels. The drive unit of active stylus 20 may transmit a signal, such as a square wave, sine wave, or digital-logic signal, that may be sensed by the electrodes of touch sensor 10. In particular embodiments, the drive unit of active stylus 20 may transmit a signal to electrodes of touch sensor 10 by applying a voltage or current to one or more electrodes of tip 26 that results in charge removal or charge addition to the electrodes of touch sensor 10, mimicking a touch or anti-touch of a finger on a pulse-by-pulse basis.

The sense unit may sense signals received by one or more electrodes of tip 26 through conduit 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, force sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, force, contact, pressure on outer body 22, force on tip 26, vibration, or any other suitable characteristic of active stylus 20. In particular embodiments, a force may be applied to tip 26, and tip 26 may be mechanically coupled to a force sensor located within outer body 22 of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may include a primary battery, such as for example an alkaline battery, or a rechargeable battery, such as for example a lithium-ion or nickel-metal-hydride battery. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source 48 may also be powered or recharged by a wired connection through an applicable port coupled to a suitable external charger or power source.

Figure 4:
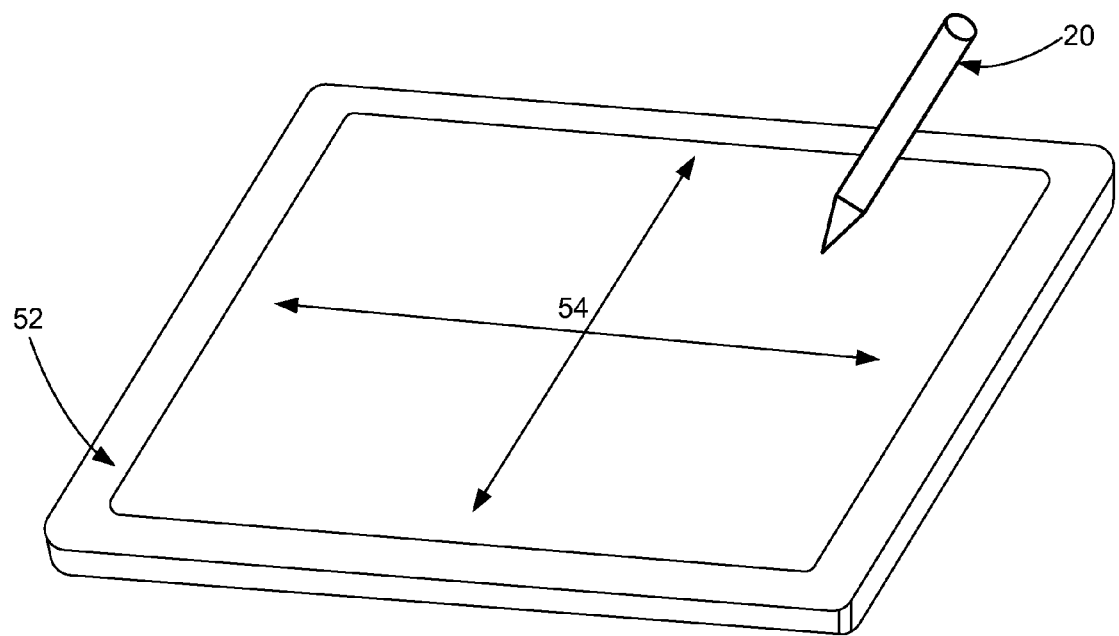
FIG. 4 illustrates an example active stylus with an example device.

FIG. 4 illustrates an example active stylus 20 with an example device 52. One example of device 52 is touch screen 10 of FIG. 1. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As an example and not by way of limitation, device 52 electronics may include circuitry or other electronics for wireless communication to or from device 52, executing programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of signals or data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device 52 by processing a drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. In particular embodiments, after active stylus 20 and device 52 are synchronized, active stylus 20 may transmit data to device 52 by performing charge addition or charge removal on one or more sense electrodes of touch sensor 10, and device 52 may receive data sent from active stylus 20 by sensing data with one or more sense electrodes of touch sensor 10. Although this disclosure describes particular interactions and communications between active stylus 20 and device 52, this disclosure contemplates any suitable interactions and communications through any suitable means, such as mechanical forces, electrical current, voltage, or electromagnetic fields.

In particular embodiments, a measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may receive signals from external sources, including device 52, a user, or another active stylus. Active stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which active stylus 20 communicates, the physical layout of the system, sensor noise, charger noise, device noise, noise from device 52 display, stylus circuitry noise, or external noise. The overall noise external to active stylus 20 may have frequency characteristics covering a wide range of the spectrum, including narrow-band noise and wide-band noise, as well. In particular embodiments, a signal received by active stylus 20 may be amplified by any suitable amplifier, including a digital or an analog amplifier. In particular embodiments, a signal received by active stylus 20 may be filtered by any suitable filter, including a digital or an analog filter.

Figure 5:
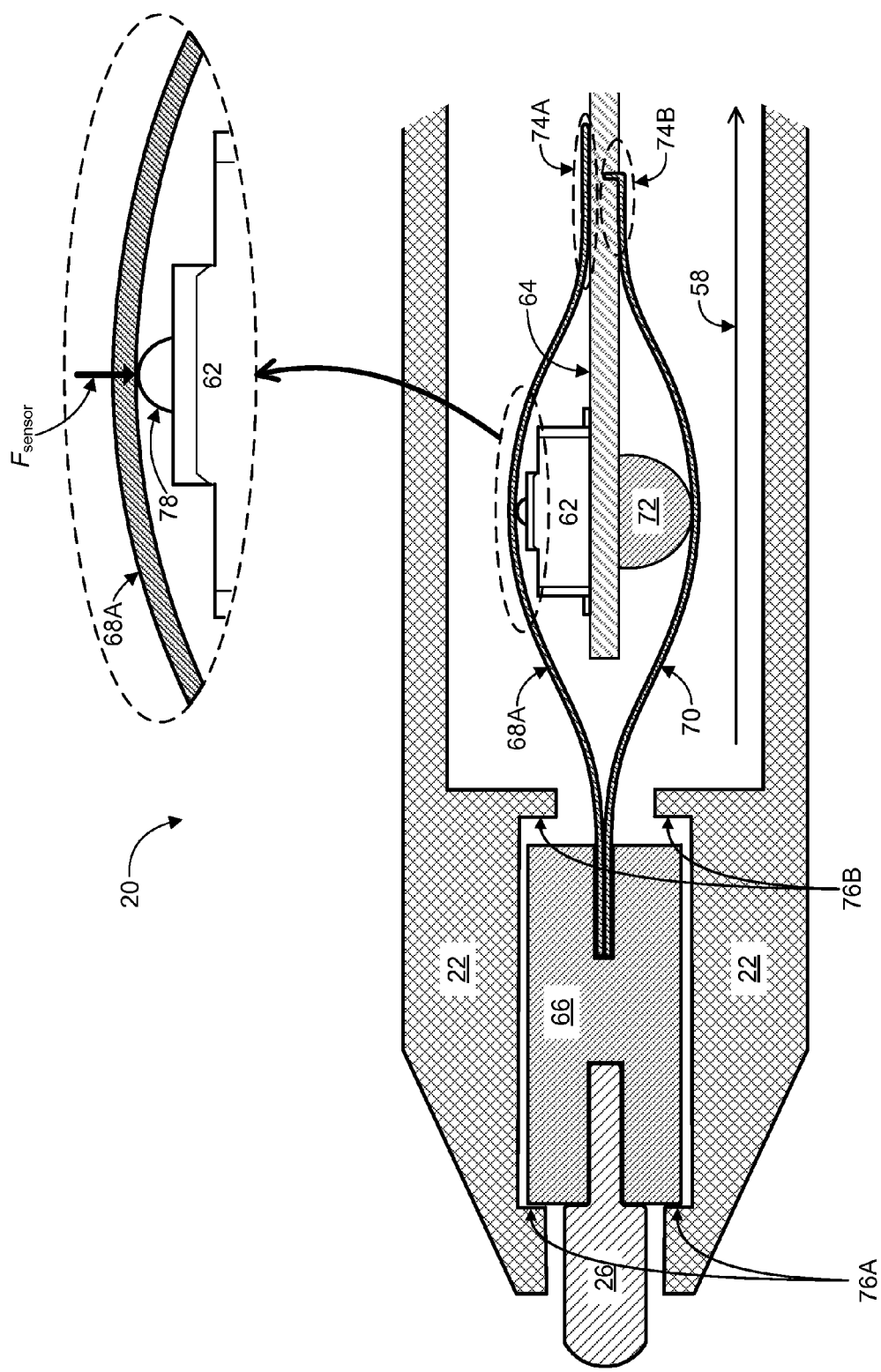
FIG. 5 illustrates a cross-sectional view of a portion of an example active stylus.

FIG. 5 illustrates a cross-sectional view of a portion of an example active stylus. In particular embodiments, tip 26 may be disposed at or near an end of active stylus 20, and tip 26 may be used to make contact with or interact with a surface, such as for example a surface of touch-sensitive area 54 of device 52. In particular embodiments, tip 26 may include or be made from one or more materials, such as for example an electrically conductive material, an electrically resistive (or, partially electrically conductive) material, an electrically insulating (or, non-conductive) material, or any suitable combination of conductive, resistive, or insulating materials. In particular embodiments, all or part of tip 26 may be made of an electrically conductive metal, such as for example aluminum, copper, or any suitable conductive metal. In particular embodiments, all or part of tip 26 may be made from an electrically conductive plastic, polymer, resin, or rubber. As an example and not by way of limitation, an electrically conductive plastic may include a plastic material, such as for example acrylonitrile butadiene styrene (ABS), combined with an electrically conductive material, such as for example carbon particles, carbon fibers, carbon nanotubes, graphite, or a conductive metal (e.g., copper or aluminum). In particular embodiments, all or part of tip 26 may be made of a resistive material, such as for example a partially conductive form of plastic, rubber, or ceramic. In particular embodiments, all or part of tip 26 may be made of an electrically insulating material, such as for example an insulating plastic (e.g., ABS) or rubber material. Although this disclosure describes and illustrates particular tips made of particular materials, this disclosure contemplates any suitable tips made of any suitable materials.

In particular embodiments, tip 26 may be attached to or mated with collet 66, which is contained within outer body 22 of active stylus 20. In particular embodiments, collet 66 may be made from one or more electrically conductive, electrically resistive, or electrically insulating materials. In particular embodiments, collet 66 may be made of an electrically conductive metal (e.g., aluminum or copper) or an electrically conductive plastic, polymer, resin, or rubber. In particular embodiments, collet 66 may be made from one or more materials similar to the materials described above with respect to tip 26. In particular embodiments, a portion of tip 26 may be inserted into a slot or hole at one end of collet 66, as illustrated in FIG. 5. In particular embodiments, tip 26 may be attached to collet 66 with an adhesive or epoxy, tip 26 may be press-fit into a slot or hole in collet 66, or tip 26 may be affixed to collet 66 with a screw or other suitable fastener. In particular embodiments, tip 26 may be substantially permanently attached to collet 66. In other particular embodiments, tip 26 may be removably attached to collet 66 enabling the removal or replacement of tip 26 by a user of active stylus 20. Although this disclosure describes and illustrates particular collets made of particular materials, this disclosure contemplates any suitable collets made of any suitable materials.

In particular embodiments, force-transfer element 68A may be attached to or mated with collet 66. As illustrated in the example of FIG. 5, an end portion of force-transfer element 68A may be inserted into a slot or hole at an end of collet 66 opposite the end where tip 26 is attached to collet 66. In particular embodiments, force-transfer element 68A may be attached to collet 66 with adhesive, epoxy, or solder; force-transfer element 68A may be press-fit into a slot or hole in collet 66; or force-transfer element 68A may be affixed to collet 66 with a screw or other suitable fastener. As illustrated in FIG. 5, collet 66 may function as a coupling element attached to tip 26 and force-transfer element 68A providing a mechanical coupling between tip 26 and force-transfer element 68A. In other particular embodiments, tip 26 may be directly attached to force-transfer element 68A without an intermediate coupling element (e.g., collet 66) present between tip 26 and force-transfer element 68A. As an example and not by way of limitation, tip 26 and force-transfer element 68A may be attached together with adhesive, epoxy, solder, or one or more screws or other suitable fasteners. In particular embodiments, tip 26 and force-transfer element 68A may be referred to as being mechanically coupled to one another regardless of whether tip 26 and force-transfer element 68A are directly coupled to one another or tip 26 and force-transfer element 68A are coupled to one another through one or more intermediate coupling elements, such as for example collet 66. Although this disclosure describes and illustrates particular tips mechanically coupled to particular force-transfer elements in particular ways, this disclosure contemplates any suitable tips mechanically coupled to any suitable force-transfer elements in any suitable ways.

As illustrated in FIG. 5, interior of active stylus 20 may include printed-circuit board (PCB) 64 with force sensor 62 attached to PCB 64. In particular embodiments, PCB 64 may be attached to or mechanically coupled to one or more portions of outer body 22. Force sensor 62 may be one of sensors 42 discussed above. In particular embodiments, force sensor 62 may include pins that are soldered to PCB 64, providing mechanical attachment and electrical coupling of force sensor 62 to PCB 64. As an example and not by way of limitation, force sensor 62 may have 6 pins that are each soldered to pads on PCB 64. In particular embodiments, force sensor 62 may include a device manufactured with microelectromechanical systems (MEMS) technology and may be referred to as a MEMS force sensor or a MEMS-based force sensor. As examples and not by way of limitation, force sensor 62 may be a MEMS-based piezoresistive force sensor, a MEMS-based resistive force sensor, a MEMS-based capacitive force sensor, or any suitable MEMS-based force sensor. In particular embodiments, force sensor 62 may include a force-sensing resistor (FSR), also referred to as a force-sensitive resistor. A FSR may include a material that changes resistance with the application of a force to the material, such as for example, a conductive polymer or a plastic or rubber material combined with electrically conductive carbon particles. In particular embodiments, force sensor 62 may include an optical-based force sensor, a magnetic-based force sensor, a piezoelectric-based force sensor, or any suitable force sensor. Although this disclosure describes and illustrates particular force sensors, this disclosure contemplates any suitable force sensor.

In particular embodiments, controller 50 may be attached to PCB 64, and force sensor 62 and controller 50 may be coupled together through conduit 41 (e.g., one or more traces on PCB 64). In particular embodiments, controller 50 may receive from force sensor 62 one or more signals, such as for example one or more voltages. In particular embodiments, a signal received by controller 50 from force sensor 62 may be associated with an amount of force applied to force-sensing element 78 of force sensor 62. In particular embodiment, based on a signal from force sensor 62, controller 50 may determine an amount of force or a change in an amount of force applied to force-sensing element 78 of force sensor 62. As an example and not by way of limitation, force sensor 62 may include one or more resistors (e.g., four resistors in a bridge configuration), and application of a force to force-sensing element 78 may result in a change in the resistance of one or more of the resistors. As a result of such a resistance change, controller 50 may measure a change in voltage across one or more of the resistors, and based on this voltage change, controller 50 may determine an amount of force or a change in the amount of force applied to force-sensing element 78.

In the example of FIG. 5, a force ($F_{sensor}$), represented by an arrow oriented in the direction of the applied force, is applied to force-sensing element 78 by force-transfer element 68A. Force $F_{sensor}$ is directed approximately orthogonal to a base of force sensor 62 or a plane of PCB 64. In particular embodiments, force-sensing element 78 may have a substantially round or spherical shape and may move in response to force $F_{sensor}$ being applied to it. As an example and not by way of limitation, in response to an applied force of approximately $F_{sensor} \cong 5$ newtons, force-sensing element 78 may move or be displaced by approximately 0.1-0.2 mm. In particular embodiments, force sensor 62 may become damaged or may not function properly if an excessive amount of force is applied to it. As an example and not by way of limitation, if an excessive force is applied to force sensor 62, force-sensing element 78 may move beyond its intended range of movement and become stuck in place, or a membrane inside force sensor 62 that force-sensing element 78 contacts may become damaged. As an example and not by way of limitation, force sensor 62 may become damaged or may not function properly if an applied force of approximately $F_{sensor} \geq 10$ newtons is applied. In particular embodiments, to prevent damage to force sensor 62, it may be preferable for the force $F_{sensor}$ to not exceed a particular maximum value, such as for example, approximately 5, 7, or 10 newtons, or any suitable maximum force value.

In the example of FIG. 5, axis 58 represents a longitudinal axis of active stylus 20 and is provided as a reference axis running along a length of active stylus 20. In particular embodiments, a longitudinal axis may run along a center of active stylus 20. In FIG. 5, longitudinal axis 58 is displaced laterally from a center of active stylus 20 for clarity of viewing the components illustrated in FIG. 5. In FIG. 5, force sensor 62 may be referred to as having a vertical orientation or an orientation that is approximately orthogonal to longitudinal axis 58. In particular embodiments, a vertical orientation or an orientation approximately orthogonal to longitudinal axis 58 may refer to the base of force sensor 62 being oriented along longitudinal axis 58 or force-sensing element 78 being oriented approximately orthogonal to longitudinal axis 58. In particular embodiments, a vertical orientation or an orientation approximately orthogonal to longitudinal axis 58 may refer to force-sensing element 78 being oriented to move in a direction approximately orthogonal to longitudinal axis 58 in response to an applied force. In particular embodiments, a vertical orientation or an orientation approximately orthogonal to longitudinal axis 58 may refer to force sensor 62 being oriented to receive or respond to a force (e.g., force $F_{sensor}$) that is directed substantially orthogonal to longitudinal axis 58. Although this disclosure describes and illustrates particular force sensors having particular orientations with respect to particular axes of an active stylus, this disclosure contemplates any suitable force sensor having any suitable orientation with respect to any suitable axis of an active stylus.

In particular embodiments, force-transfer element 68A may be made of a material having spring-like, flexible, or resilient properties. In particular embodiments, force-transfer element 68A may have a substantially flat shape, and when bent or flexed, force-transfer element 68A may exert a spring force or a restoring force as it tries to recover to a quiescent or unperturbed flat shape. In particular embodiments, force-transfer element 68A may be made of a strip of material having a thickness of approximately 0.1-1.0 mm. In particular embodiments, force-transfer element 68A may be made of spring steel, stainless steel, or any other suitable spring-like, resilient, or flexible material. In particular embodiments, force-transfer element 68A may be made of an electrically conductive material. Although this disclosure describes and illustrates particular force-transfer elements made of particular materials, this disclosure contemplates any suitable force-transfer elements made of any suitable materials.

In particular embodiments, an end or a portion of force-transfer element 68A may be attached to PCB 64. As examples and not by way of limitation, force-transfer element 68A may be soldered to PCB 64, epoxied to PCB 64, or attached to PCB 64 with one or more screws or other suitable fasteners. As another example and not by way of limitation, an end of force-transfer element 68A may be inserted through one or more holes in PCB 64 and then soldered or screwed in placed. In the example of FIG. 5, force-transfer element 68A has an end that is attached to PCB 64 in region 74A. In particular embodiments, the end of force-transfer element 68A in region 74A may be thicker than the rest of force-transfer element 68A to provide additional rigidity in that region. Additional rigidity of force-transfer element 68A in attachment region 74A may provide for a more secure attachment of force-transfer element 68A to PCB 64 or may reduce stress on PCB 64 associated with a flexing of force-transfer element 68A. As an example and not by way of limitation, in region 74A, force-transfer element 68A may have a thickness of approximately 1-5 mm, and elsewhere, force-transfer element 68A may have a thickness of approximately 0.1-1.0 mm. In particular embodiments, a thicker section (e.g., thickness of approximately 1-5 mm), a tab, or another suitable end feature of force-transfer element 68A may be formed by pressing a flat metal strip around a forming tool to produce a desired thickness, feature, or shape. Although this disclosure describes and illustrates particular force-transfer elements attached to particular parts of an active stylus in particular manners, this disclosure contemplates any suitable force-transfer elements attached to any suitable parts of an active stylus in any suitable manner.

In particular embodiments, one end of force-transfer element 68A may be attached to tip 26 or collet 66, and another end may be attached to PCB 64. As illustrated in FIG. 5, force-transfer element 68A may be flexed or bent around force sensor 62, and part of force-transfer element 68A may make contact with force-sensing element 78. Since force-transfer element 68A is bent away from its quiescent flat state, force-transfer element 68A may apply a spring or restoring force (e.g., $F_{sensor}$) to force-sensing element 78. The spring or restoring force may be directed towards PCB 64 and may be oriented substantially orthogonal to longitudinal axis 58. One or more signals corresponding to an amount of force applied by force-transfer element 68A to force-sensing element 78 may be received by controller 50, and controller 50 may process the signals to determine a value associated with the force.

In particular embodiments, spring element 70, which may be similar to force-transfer element 68A, may be included in active stylus 20. In particular embodiments, spring element 70 may be made from the same or similar material as force-transfer element 68A. In the example of FIG. 5, spring element 70 is located on the opposite side of PCB 64 from force-transfer element 68A with one end attached to collet 66 and another end attached to PCB 64 in region 74B. In FIG. 5, spring element 70 has a tab or a bent feature where it attaches to PCB 64. In particular embodiments, force-transfer element 68A or spring element 70 may have a tab or bent feature that is inserted into a mating feature on PCB 64 for attachment. As an example and not by way of limitation, a tab at the end of force-transfer element 68A or spring element 70 may be inserted into a hole in PCB 64 and attached to PCB 64 by means of solder. In particular embodiments, one end of force-transfer element 68A and spring element 70 may be attached to collet 66, and their other ends may be attached to opposite sides of PCB 64. In particular embodiments, both force-transfer element 68A and spring element 70 may be directly attached to tip 26 with no collet 66 or other intermediate coupling element present.

In particular embodiments, force-transfer element 68A may apply one or more torques or lateral (e.g., substantially orthogonal to longitudinal axis 58) forces to tip 26, collet 66, or PCB 64, and spring element 70 may substantially balance out such potentially undesirable forces. In FIG. 5, spring element 70 is flexed or bent around bump feature 72. Bump feature 72 may be a piece of suitable material attached to PCB 64 and configured so that spring element 70 is flexed or bent similar to force-transfer element 68A. A lateral force exerted by force-transfer element 68A to PCB 64 via force sensor 62 may be substantially balanced by an oppositely directed force exerted by spring element 70 to PCB 64 via bump 72. Similarly, lateral forces exerted by force-transfer element 68A and spring element 70 to tip 26 or collet 66 may be balanced out so that there is little or no net lateral force applied to tip 26 or collet 66. In particular embodiments, force-transfer element 68A and spring element 70 may be configured so that there is a net longitudinal force applied to tip 26 or collet 66. In FIG. 5, a net longitudinal force applied by force-transfer element 68A and spring element 70 to collet 66 may act to push collet 66 against hard stops 76A in outer body 22.

In particular embodiments, all or part of tip 26 may be made of an electrically conductive material that is coupled to controller 50, and tip 26 may act as a transmit or receive electrode. In particular embodiments, tip 26 may be configured as a transmit electrode for wirelessly transmitting signals to device 52 through touch-sensitive area 54. Additionally, collet 66, force-transfer element 68A, or spring element 70 may each be made of an electrically conductive material and may provide at least a portion of an electrical connection between tip 26 and controller 50. As an example and not by way of limitation, tip 26 may be electrically coupled to collet 66 which in turn is electrically coupled to spring element 70. Spring element 70 may be soldered to PCB 64 at attachment region 74B, which is electrically coupled to controller 50. As another example and not by way of limitation, tip 26 may be configured as a transmit electrode, and tip 26 may be electrically coupled to force-transfer element 68A, either directly or through collet 66. Force-transfer element 68A may be soldered to PCB 64 at attachment region 74A, which is electrically coupled to controller. Although this disclosure describes and illustrates particular active-stylus electrodes electrically coupled to particular active-stylus controllers through particular combinations of tips, collets, force-transfer elements, or spring elements, this disclosure contemplates any suitable active-stylus electrodes electrically coupled to any suitable active-stylus controllers through any suitable combinations of tips, collets, force-transfer elements, or spring elements.

Figure 6:
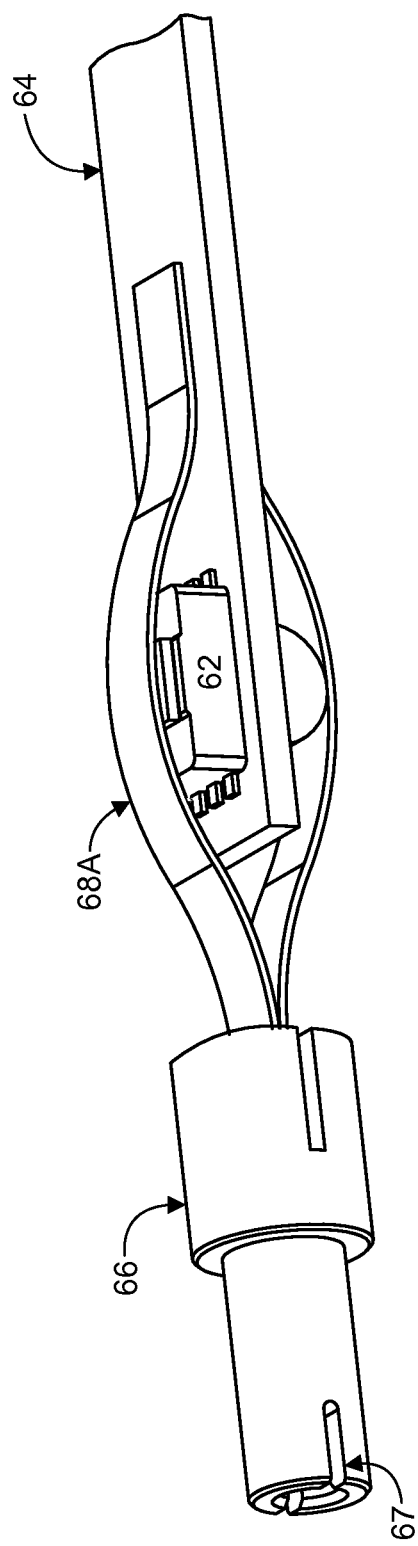
FIG. 6 illustrates a perspective view of a portion of the example active stylus of FIG. 5.

FIG. 6 illustrates a perspective view of a portion of the example active stylus of FIG. 5. In FIG. 6, collet 66 is coupled to one end of force-transfer element 68A, and the other end of force-transfer element 68A is attached to PCB 64. Force sensor 62 is an electrical component in a surface-mount IC package with pins soldered to PCB 64. Force-transfer element 68A is a strip of spring-like material that is bent to extend over and apply a force to force sensor 62. A tip is not shown in FIG. 6, and slot 67 at an end of collet 66 indicates a part of collet 66 where a tip may be attached. In particular embodiments, the configuration and dimensions of force-transfer element 68A may be selected such that the force applied to force sensor 62 may not exceed a particular maximum value.

Figure 7:
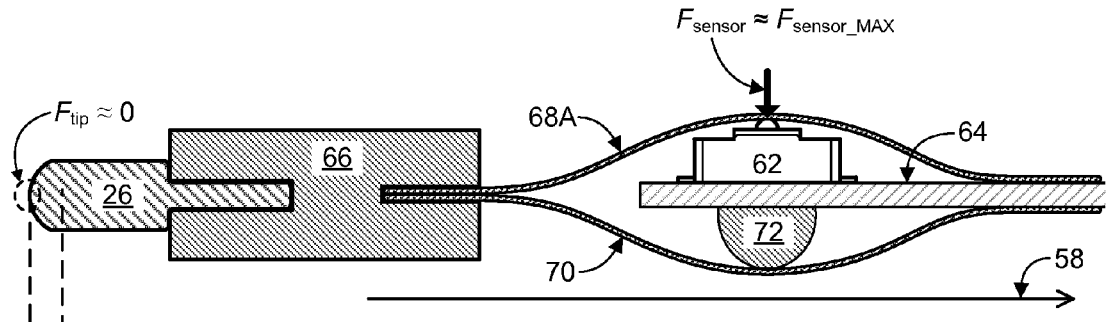
FIGS. 7-9 illustrate example active-stylus cross-sectional views similar to FIG. 5 along with example forces applied to the tip.
Figure 8:
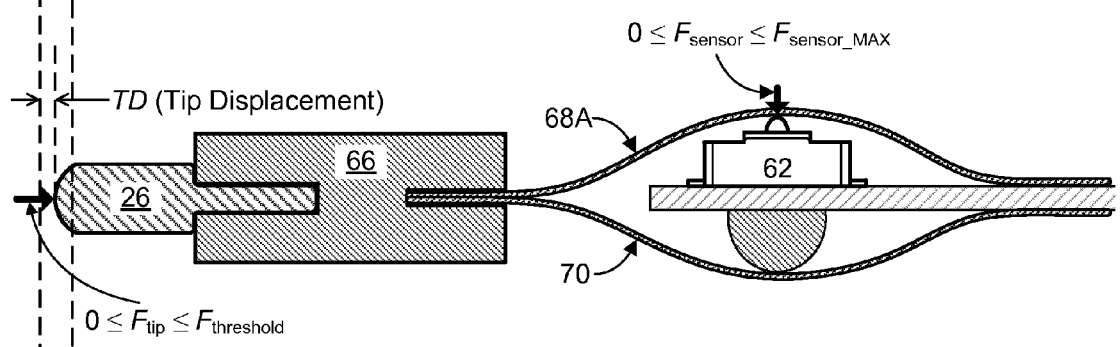
Figure 9:
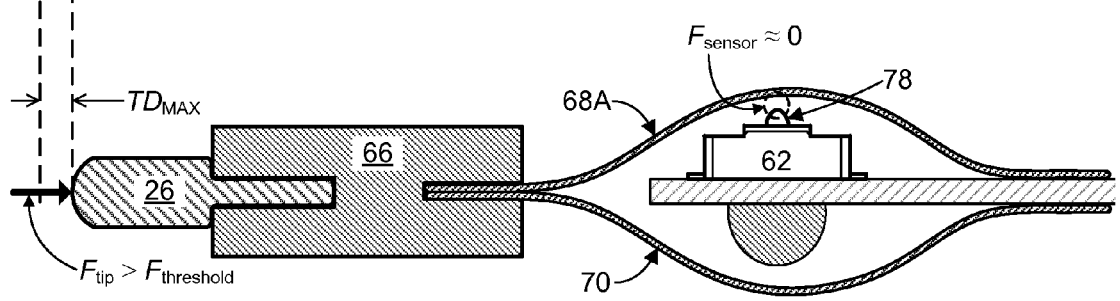

FIGS. 7-9 illustrate example active-stylus cross-sectional views similar to FIG. 5 along with example forces applied to tip 26. In the examples of FIGS. 7-9, force $F_{tip}$ represents a force applied to tip 26. In particular embodiments, a force applied to tip 26 may result at least in part from a user holding active stylus 20 and pressing tip 26 against a surface, such as for example a surface of touch-sensitive area 54 of device 52. In particular embodiments, active stylus 20 may be oriented substantially orthogonal to a surface it is pressed against, and force $F_{tip}$ may be directed substantially parallel to longitudinal axis 58. In particular embodiments, active stylus 20 may be oriented at an oblique angle relative to a surface it is pressed against, and force $F_{tip}$ may represent a component of an applied force, where $F_{tip}$ is directed substantially parallel to longitudinal axis 58. As illustrated in FIGS. 7-9, when force $F_{tip}$ is applied to tip 26, force-transfer element 68A flexes outward, away from force sensor 62, which reduces force $F_{sensor}$, the force applied to force sensor 62.

FIGS. 7-9 illustrate example displacements or positions of tip 26, collet 66, force-transfer element 68A, spring element 70, and force-sensing element 78 as a result of various magnitudes of forces $F_{tip}$ applied to tip 26. FIG. 7 represents a resting position where little or no force is applied to tip 26 and $F_{tip}$ is approximately zero. In the example of FIG. 7, force-transfer element 68A is configured to apply a maximum force ($F_{sensor} \approx F_{sensor\_MAX}$) to force-sensing element 78. In particular embodiments, force-transfer element 68A and other elements in FIG. 7 may be configured so that the maximum force, $F_{sensor\_MAX}$, is less than an absolute maximum force rating for force sensor 62. As an example and not by way of limitation, force sensor 62 may have an absolute maximum force rating of 10 newtons, and force-transfer element 68A may be configured so that $F_{sensor\_MAX}$ is approximately 5-6 newtons. In particular embodiments, a length, width, or thickness of force-transfer element 68A or a type of material force-transfer element 68A is made of may be selected so that $F_{sensor\_MAX}$ is set to an appropriate value. Although this disclosure describes and illustrates particular force sensors having particular absolute maximum force ratings and configured to have particular applied maximum forces, this disclosure contemplates any suitable force sensor having any suitable absolute maximum force rating and configured to have any suitable applied maximum force.

In particular embodiments, as tip 26 is pressed against a surface, force-transfer element 68A and spring element 70 may flex or bend outward and away from PCB 64, which remains substantially stationary. In the example of FIG. 8, force $F_{tip}$ (represented by an arrow) is applied to tip 26 so that $0 \leq F_{tip} \leq F_{threshold}$. The threshold force, $F_{threshold}$, represents a force applied to tip 26 necessary to reduce the force on the force sensor, $F_{sensor}$, to approximately zero. In response to the applied force $F_{tip}$, tip 26 is displaced in a direction substantially parallel to longitudinal axis 58 and toward force sensor 62 and PCB 64 by a distance approximately equal to Tip Displacement (TD). Collet 66 is also displaced by approximately TD, which causes the end of force-transfer element 68A attached to collet 66 to also be displaced toward force sensor 62 and PCB 64 by approximately TD. Displacement of the end of force-transfer element 68A causes an outward flexing (e.g., flexing away from force sensor 62 and PCB 64) of a portion of force-transfer element 68A that is adjacent to force sensor 62. The outward flexing of force-transfer element 68A causes a point where force-transfer element 68A contacts force-sensing element 78 to move outward. The outward movement of force-transfer element 68A reduces the force $F_{sensor}$ applied to force sensor 62 at force-sensing element 78 so that $0 \leq F_{sensor} \leq F_{sensor\_MAX}$.

In particular embodiments, as force-transfer element 68A flexes outward, force-sensing element 78 may also move outward and remain in contact with force-transfer element 68A. In particular embodiments, force-sensing element 78 may continue to move outward until it reaches a maximum outward extent, at which point force-sensing element 78 will stop moving outward and force on force sensor 62 is approximately zero. In particular embodiments, force-sensing element 78 may have a total range of motion of approximately 0.1-0.2 mm. As an example and not by way of limitation, when a force $F_{sensor\_MAX}$ is applied to force sensor 62, force-sensing element 78 may move approximately 0.2 mm toward its base relative to the position of force-sensing element 78 when approximately zero force is applied to force sensor 62. Although this disclosure describes and illustrates particular force sensing elements with particular ranges of motion, this disclosure contemplates any suitable force sensing element with any suitable range of motion.

In particular embodiments, as $F_{tip}$ increases, $F_{sensor}$ may remain constant or decrease, and when $F_{tip}$ reaches a value of approximately $F_{threshold}$, then $F_{sensor}$ may be approximately zero. In particular embodiments, for low values of $F_{tip}$, the force $F_{sensor}$ may remain substantially constant (e.g., $F_{sensor} \approx F_{sensor\_MAX}$) until $F_{tip}$ overcomes any opposing or preload longitudinal force applied by force-transfer element 68A or spring element 70. Once $F_{tip}$ matches any opposing force, any additional increase in $F_{tip}$ may result in a decrease in $F_{sensor}$. When $F_{tip}$ is less than a particular threshold force ($F_{threshold}$), then the force applied to the sensor ($F_{sensor}$) may be referred to as being inversely correlated or negatively correlated with the force applied to tip 26 ($F_{tip}$). In particular embodiments, an inverse correlation between two forces may refer to two forces that change inversely to one another so that when one force (e.g., $F_{tip}$) increases, the other force (e.g., $F_{sensor}$) decreases, and vice versa. In particular embodiments, $F_{sensor}$, the force applied to force sensor 62 by force-transfer element 68A may be referred to as an inverse transferred force. As force-transfer element 68A flexes outward, the force applied to force sensor 62 is reduced, and this change in force can be detected by a change in a signal coupled to controller 50. When the force applied to the tip is reduced back to $F_{tip} \approx 0$, force-transfer element 68A and spring element 70 may return to their original resting positions, and force-transfer element 68A again applies a force of approximately $F_{sensor\_MAX}$ to force sensor 62.

In the example of FIG. 9, force $F_{tip}$ is greater than the threshold force $F_{threshold}$, and the force applied to force sensor 62 by force-transfer element 68A is approximately zero. In particular embodiments, when $F_{tip} > F_{threshold}$, then force transfer element 68A may not be in contact with force-sensing element 78. When $F_{tip}$ reaches a value of approximately $F_{threshold}$, then force-transfer element 68A may be just barely in contact with force-sensing element 78. As illustrated in FIG. 9, when $F_{tip}$ exceeds $F_{threshold}$, then force-transfer element 68A may flex outward so that force-transfer element 68A no longer makes contact with force-sensing element 78. In particular embodiments, for any suitable value of $F_{tip}$ that is greater than $F_{threshold}$, the force applied to force sensor 62 by force-transfer element 68A may be approximately zero. In particular embodiments, tip 26, collet 66, or force-transfer element 68A may be configured so that $F_{threshold}$ is approximately 2 newtons, 4 newtons, 6 newtons, or any suitable amount of force.

In particular embodiments, displacement of tip 26 may be limited to a maximum value $TD_{MAX}$ so that $0 \leq TD \leq TD_{MAX}$. As illustrated in the example of FIG. 5, outer body 22 may include hard stops 76B that the end of collet 66 may make contact with when a particular force is applied to tip 26. In particular embodiments, tip 26, collet 66, or outer body 22 may be configured so that the maximum tip displacement, $TD_{MAX}$, may be approximately 0.1 mm, 0.2 mm, 0.5 mm, 1.0 mm, or any suitable displacement value. Although this disclosure describes and illustrates particular tips having particular tip displacements and particular maximum tip displacements, this disclosure contemplates any suitable tip having any suitable tip displacement and any suitable maximum tip displacement.

Figure 10:
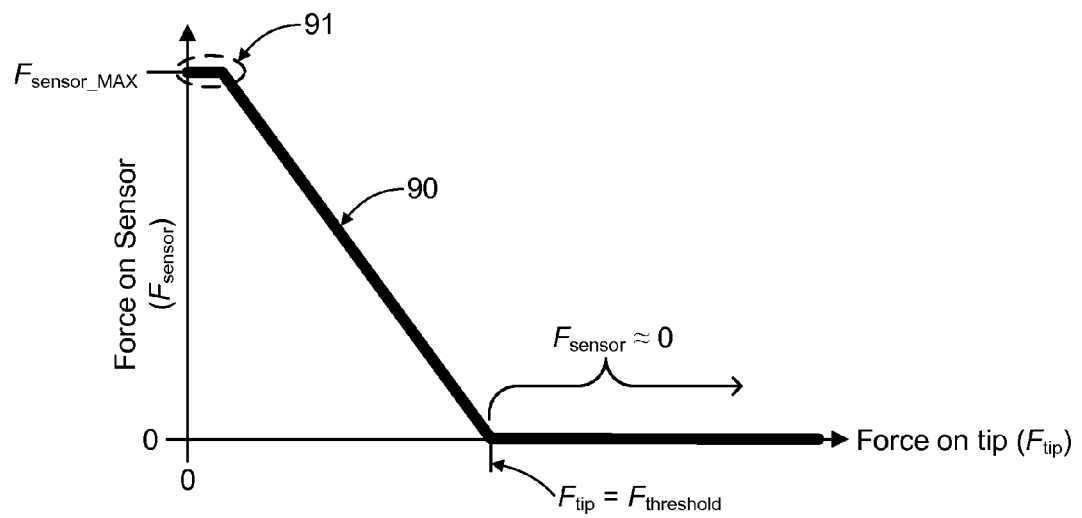
FIG. 10 illustrates an example plot of force on a sensor versus force on an active-stylus tip.

FIG. 10 illustrates an example plot 90 of force on a force sensor ($F_{sensor}$) versus force on an active-stylus tip ($F_{tip}$). In the example of FIG. 10, when the force applied to tip 26 is zero ($F_{tip}$=0), the force on force sensor 62 is at a maximum value of approximately $F_{sensor\_MAX}$. In particular embodiments and as illustrated by region 91 of plot 90, for low values of $F_{tip}$, the force on force sensor 62 may be substantially constant and approximately equal to $F_{sensor\_MAX}$. In particular embodiments, $F_{sensor}$ may remain substantially constant until $F_{tip}$ reaches a value that overcomes or equals any opposing or preload longitudinal force applied by force-transfer element 68A or spring element 70. In the example of FIG. 10, the slope of plot 90 is approximately zero in region 91, and then for values of $F_{tip}$ that overcome a preload force, the slope of plot 90 is negative. As the force applied to tip 26 increases, the force on sensor 62 decreases, which as discussed above, represents an inverse correlation between $F_{sensor}$ and $F_{tip}$. In particular embodiments, the force on sensor 62 may decrease monotonically as the force on tip 26 increases. In particular embodiments and as illustrated in FIG. 10, an inverse correlation between $F_{sensor}$ and $F_{tip}$ may be associated with a zero or negative slope in a plot of $F_{sensor}$ versus $F_{tip}$. In particular embodiments, when the force applied to tip 26 is greater than or equal to $F_{threshold}$, then the force on force sensor 62 may be approximately a constant value. In the example of FIG. 10, when the force applied to tip 26 is greater than or equal to $F_{threshold}$, then the force on force sensor 62 is approximately zero. In FIG. 10, plot 90 indicates a monotonically decreasing and piecewise-linear relationship between $F_{sensor}$ and $F_{tip}$. In particular embodiments, a plot of $F_{sensor}$ versus $F_{tip}$ may be monotonically decreasing and may include one or more portions that are linear or curved. In particular embodiments, $F_{sensor}$ and $F_{tip}$ may exhibit an inverse correlation, and over a certain range of $F_{tip}$, a plot of $F_{sensor}$ versus $F_{tip}$ may exhibit a linear relationship, a polynomial relationship, a logarithmic relationship, an exponential relationship, a monotonically decreasing relationship, or any suitable relationship.

Figure 11:
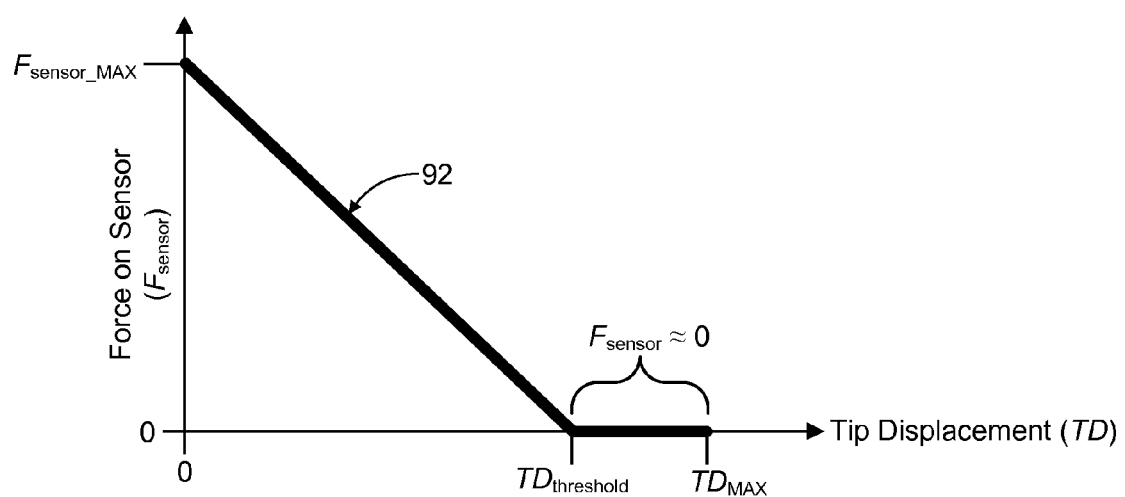
FIG. 11 illustrates an example plot of force on a sensor versus displacement of an active-stylus tip.

FIG. 11 illustrates an example plot 92 of force on a sensor ($F_{sensor}$) versus displacement of an active-stylus tip (TD). As illustrated in the example of FIG. 11, when tip displacement is zero (TD=0), the force on force sensor 62 is at a maximum value of approximately $F_{sensor\_MAX}$. As a force is applied to tip 26, TD increases, and the force on force sensor 62 decreases. When the tip displacement reaches a value of $TD_{threshold}$, then the force on sensor 62 is approximately zero. The maximum tip displacement $TD_{MAX}$ may occur when a part of tip 26 or collet 66 makes contact with a hard stop, such as for example hard stop 76B in FIG. 5. In particular embodiments, $TD_{threshold}$ may be less than or equal to $TD_{MAX}$, and $TD_{threshold}$ may be approximately 0.1 mm, 0.2 mm, 0.5 mm, 1.0 mm, or any suitable displacement value.

In particular embodiments, tip 26 may be mechanically coupled to force sensor 62 by force-transfer element 68A so that force sensor 62 may not be damaged by application of an excessive force, mechanical shock, or impact to tip 26. As an example and not by way of limitation, active stylus 20 may be accidentally dropped onto a surface from a certain height (e.g., approximately 0.5 or 1.0 m), and the drop may impart a sudden and excessive force (e.g., 100, 200, or 300 newtons, or any other suitable excessive amount of force) to tip 26. In particular embodiments, due to an inverse correlation between the force on tip 26 and the force on force sensor 62, an excessive force applied to tip 26 may cause the force on sensor 62 to be reduced to a small force or to approximately zero force. In particular embodiments, due to an inverse correlation between the force on tip 26 and the force on force sensor 62, sensor 62 may not be damaged by application of an excessive force to tip 26. In particular embodiments, when tip 26 is subject to an excessive amount of force (e.g., when active stylus 20 is dropped, with tip 26 facing down, onto a floor), force-sensing element 78 of force sensor 62 may not be subject to an excessive amount of force. As an example and not by way of limitation, force sensor 62 may not be damaged by an excessive force applied to tip 26 of approximately 10 newtons, 20 newtons, 40 newtons, or any other suitable excessive amount of force.

Figure 12:
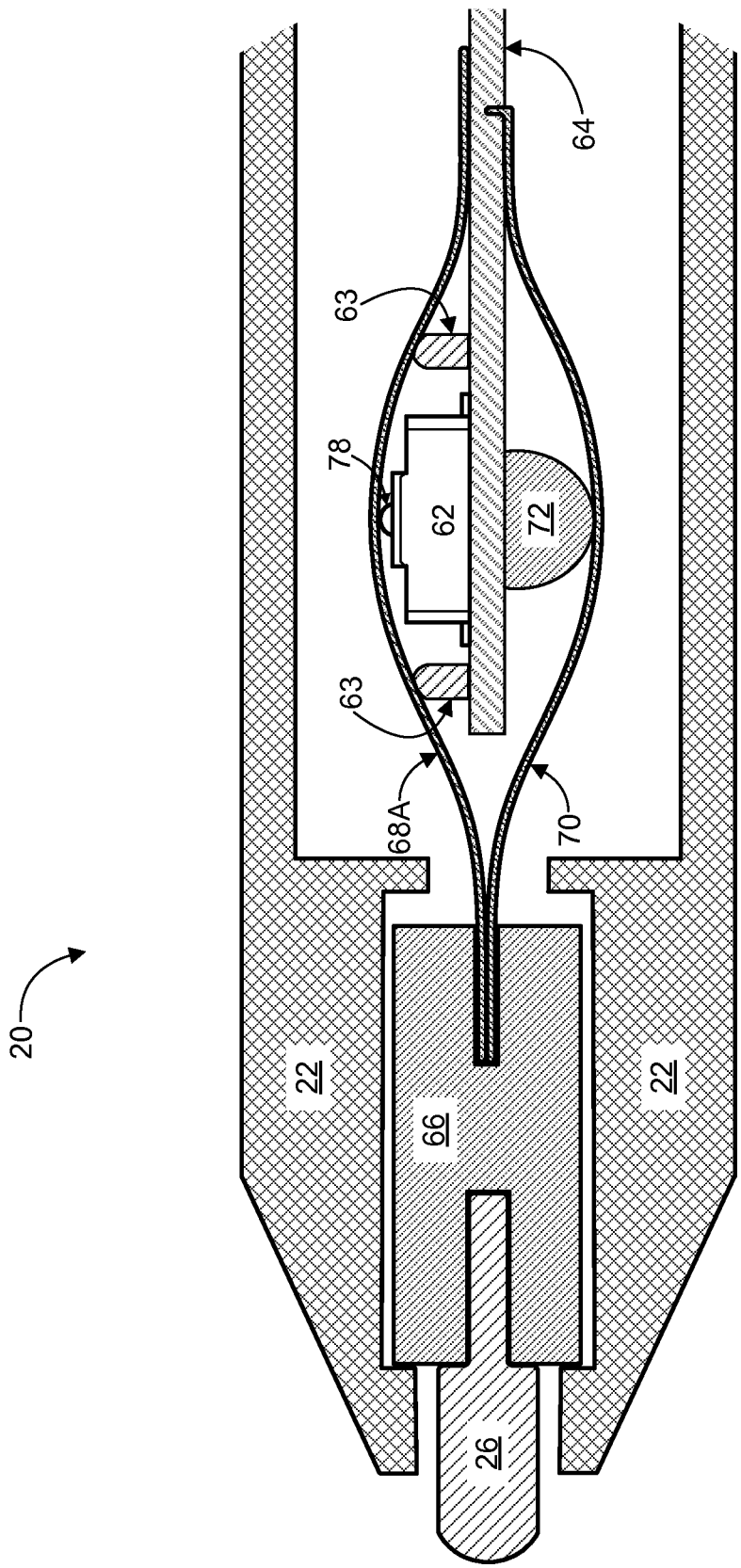
FIG. 12 illustrates the example active stylus of FIG. 5 with example absorbers.

FIG. 12 illustrates the example active stylus of FIG. 5 with example absorbers 63. In particular embodiments, active stylus 20 may include one or more absorbers 63 located near, around, or adjacent to force sensor 62, and absorber 63 may act as a shock absorber or dampener. In particular embodiments, one or more absorbers 63 may act to absorb a rebound force from force-transfer element 68A as force-transfer element 68A recovers to its resting position after application of an excessive force or mechanical shock to tip 26. In particular embodiments, when active stylus 20 is dropped and a mechanical shock is imparted to tip 26, force-transfer element 68A may be pushed away from force sensor 62, and when the mechanical shock subsides, force-transfer element 68A may recover to a resting position in contact with force-sensing element 78. In particular embodiments, when force-transfer element 68A recovers to a resting position, it may snap or rebound back to a resting position, and, without absorber 63 present, this snapping motion may impart a sudden impact or rebound force to force-sensing element 78. In particular embodiments, absorber 63 may be configured to absorb some or substantially all of a rebound force from force-transfer element 68A as it snaps back into a resting position in contact with force-sensing element 78. In particular embodiments, absorber 63 may be configured to absorb most of a rebound force from force-transfer element 68A so that any portion of a rebound force from force-transfer element imparted to force-sensing element 78 is less than an absolute maximum force rating for force sensor 62.

In particular embodiments, absorber 63 may be attached to PCB 64, a surface of force sensor 62, or a surface of force-transfer element 68A. In particular embodiments, absorber 63 may be made of rubber, plastic, or any other suitable material having a flexible or rubber-like property suitable for acting as a shock absorber or dampener. In particular embodiments, when force-transfer element 68A is pushed away from force sensor 62, absorber 63 may be configured to expand outward and away from PCB 64 so that when force-transfer element 68A snaps back, force-transfer element 68A makes contact with absorber 63 first before making contact with force-sensing element 78. In particular embodiments, when force-transfer element 68A is pushed away from force sensor 62, absorber 63 may be configured to expand outward and away from PCB 64 and remain in contact with force-transfer element 68A, and when force-transfer element 68A snaps back, absorber will absorb most of the rebound force from force-transfer element 68A before force-transfer element makes contact with force-sensing element 78. In particular embodiments, active stylus may include one or more absorbers 63, and absorbers may have a spherical, circular, rounded, or cylindrical shape, or any other suitable shape. In particular embodiments, absorber 63 may surround force sensor 62 and absorber 63 may have an overall circular or toroidal shape and a circular, rectangular, or any other suitable cross-sectional shape. As an example and not by way of limitation, absorber 63 may be a rubber O-ring configured to fit around force sensor 62. Although this disclosure describes and illustrates particular absorbers having particular shapes and made from particular materials, this disclosure contemplates any suitable absorbers having any suitable shapes and made from any suitable materials.

Figure 13:
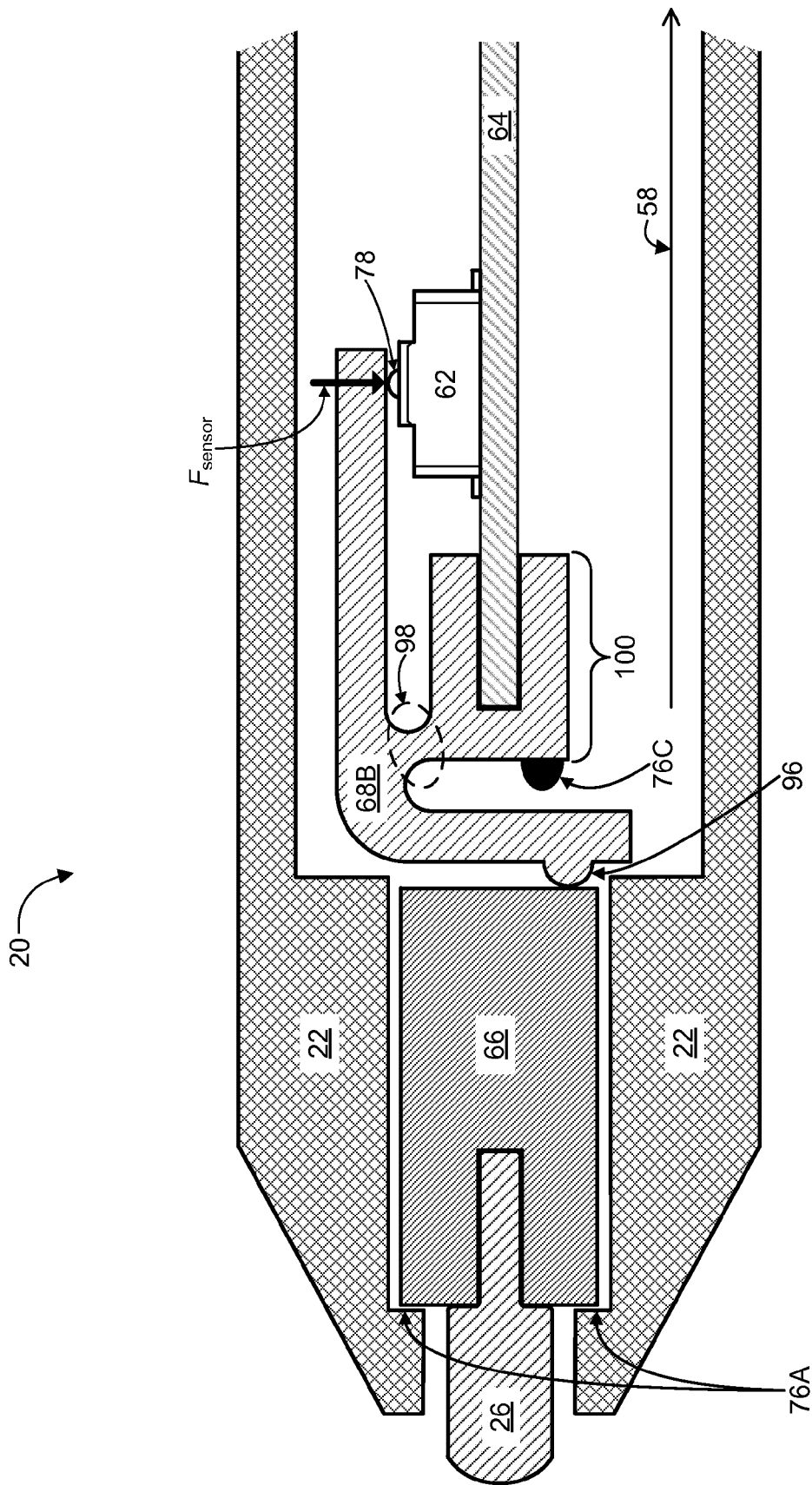
FIG. 13 illustrates a cross-sectional view of a portion of another example active stylus.

FIG. 13 illustrates a cross-sectional view of a portion of another example active stylus. In the example of FIG. 13, tip 26 is attached to collet 66, and collet 66 is in contact with force-transfer element 68B. Force-transfer element 68B is another embodiment of a force-transfer element that functions in a similar manner to force-transfer element 68A described above. In particular embodiments, force-transfer element 68B may function as a pivot lever that is attached to PCB 64 in attachment region 100 and pivots or flexes about neck region 98. In particular embodiments, force-transfer element 68B may have two arms, one arm mechanically coupled to tip 26 or collet 66 and another arm that applies an inverse transferred force ($F_{sensor}$) to force sensor 62. Although this disclosure describes and illustrates particular force-transfer elements configured to apply particular inverse transferred forces to particular force sensors, this disclosure contemplates any suitable force-transfer element configured to apply any suitable inverse transferred force to any suitable force sensor.

As illustrated in the example of FIG. 13, force-transfer element 68B may include a contact feature 96 that protrudes out from a surface of force-transfer element 68B. In particular embodiments, contact feature 96 may be configured to make contact with tip 26 or collet 66. In particular embodiments, contact feature 96 may be in mechanical or electrical contact with tip 26 or collet 66, and contact feature 96 may not be permanently or rigidly attached (e.g., with epoxy) to tip 26 or collet 66. In particular embodiments, contact feature 96 may be coupled to tip 26 or collet 66 by means of a screw or pin that allows contact feature 96 to rotate or move relative to tip 26 or collet 66. In particular embodiments, force-transfer element 68B may be configured so that there is a preload force applied by contact feature 96 to collet 66, and the preload force may push collet 66 against hard stops 76A when there is no force applied to tip 26.

In particular embodiments, force-transfer element 68B may be made of a material having spring-like, flexible, or resilient properties that allows force-transfer element 68B to flex about neck region 98. In particular embodiments, the dimensions of neck region 98 may be selected to provide an appropriate amount of spring-like property to force-transfer element 68B. In particular embodiments, force-transfer element 68B may be made of brass, copper, aluminum, steel, spring steel, stainless steel, or any suitable metal material. In particular embodiments, force-transfer element 68B may be made of a plastic material, such as for example ABS. In particular embodiments, force-transfer element 68B may be made of an electrically conductive material, such as for example an electrically conductive metal or an electrically conductive plastic (e.g., ABS combined with a conductive form of carbon). In particular embodiments, tip 26 may be configured as a transmit or receive electrode, and tip 26, collet 66, or force-transfer element 68B may each be made of an electrically conductive material and may provide at least a portion of an electrical connection between tip 26 and controller 50.

In particular embodiments, force-transfer element 68B may be attached to PCB 64 at attachment region 100. In particular embodiments, attachment region 100 may be configured to press fit onto a portion of PCB 64. In particular embodiments, attachment region 100 of force-transfer element 68B may be soldered, epoxied, or fastened with one or more screws (or other suitable fasteners) to PCB 64. In particular embodiments, force-transfer element 68B may be made of an electrically conductive material, and force-transfer element 68B may be soldered to PCB 64.

In the example of FIG. 13, a force ($F_{sensor}$), represented by an arrow oriented in the direction of the applied force, is applied to force-sensing element 78 by an arm of force-transfer element 68B. Force $F_{sensor}$ is directed approximately orthogonal to a base of force sensor 62 or a plane of PCB 64. In particular embodiments, neck region 98 of force-transfer element 68B may be flexed so that an arm of force-transfer element 68B applies a spring or restoring force to force-sensing element 78. In particular embodiments, the spring or restoring force (e.g., $F_{sensor}$) may be directed towards PCB 64 and may be oriented substantially orthogonal to longitudinal axis 58.

Figure 14:
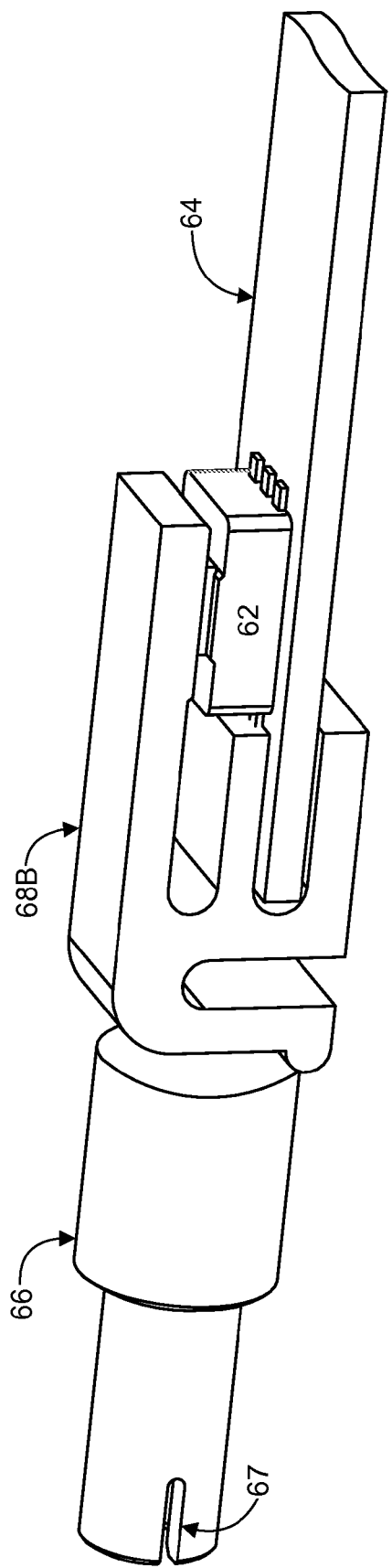
FIG. 14 illustrates a perspective view of a portion of the example active stylus of FIG. 13.

FIG. 14 illustrates a perspective view of a portion of the example active stylus of FIG. 13. A tip is not shown in FIG. 14, and slot 67 at an end of collet 66 indicates a part of collet 66 where a tip may be attached. In particular embodiments, the configuration and dimensions of force-transfer element 68B may be selected such that the force applied to force sensor 62 may not exceed a particular maximum value.

Figure 15:
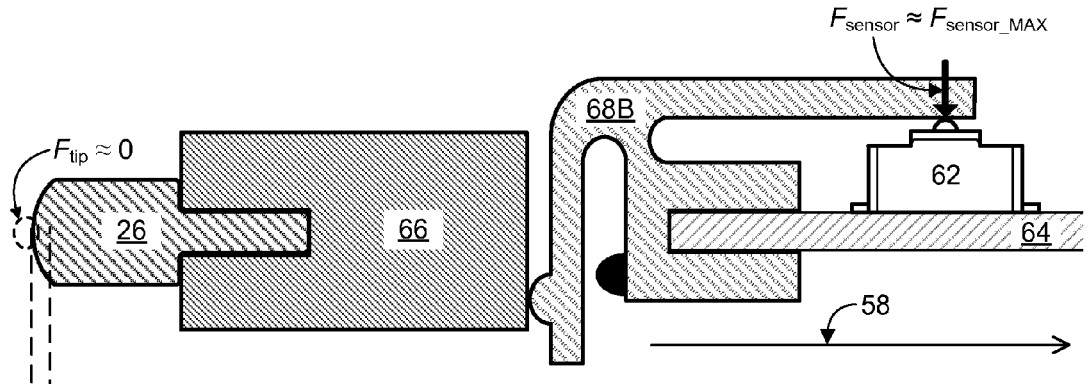
FIGS. 15-17 illustrate example active-stylus cross-sectional views similar to FIG. 13 along with example forces applied to the tip.
Figure 16:
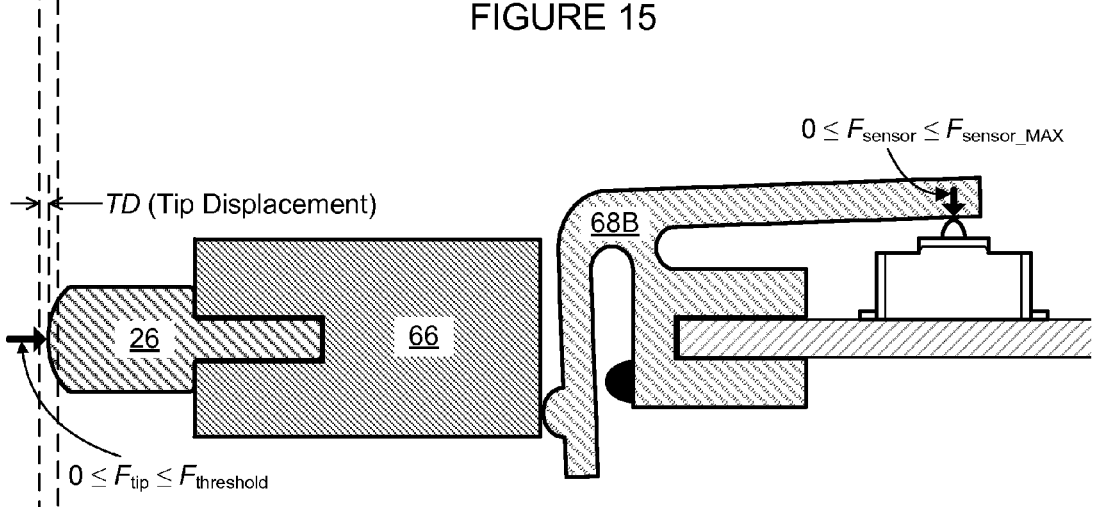
Figure 17:
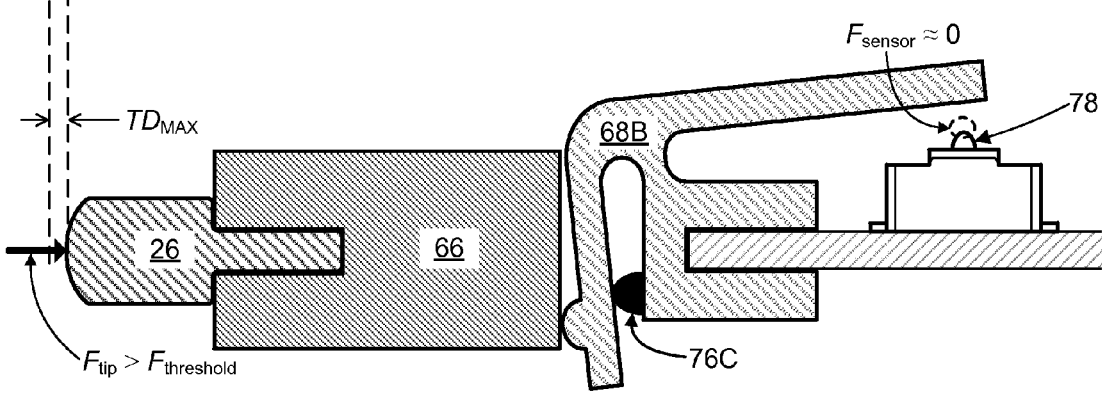

FIGS. 15-17 illustrate example active-stylus cross-sectional views similar to FIG. 13 along with example forces applied to the tip. In the examples of FIGS. 15-17, force $F_{tip}$ represents a force applied to tip 26. In particular embodiments, a force applied to tip 26 may result at least in part from a user holding active stylus 20 and pressing tip 26 against a surface. FIGS. 15-17 illustrate example displacements or positions of tip 26, collet 66, force-transfer element 68B, and force-sensing element 78 as a result of various magnitudes of forces $F_{tip}$ applied to tip 26. FIG. 15 represents a resting position where little or no force is applied to tip 26 and $F_{tip}$ is approximately zero. In the example of FIG. 15, force-transfer element 68B is flexed about neck region 98 so that a maximum force ($F_{sensor} \approx F_{sensor\_MAX}$) is applied to force-sensing element 78. In particular embodiments, force-transfer element 68B and other elements in FIG. 7 may be configured so that the maximum force, $F_{sensor\_MAX}$, is less than an absolute maximum force rating for force sensor 62. In particular embodiments, a width of neck region 98 or an amount of flexing of force-transfer element 68B may be selected so that $F_{sensor\_MAX}$ is set to an appropriate value.

In particular embodiments, as tip 26 is pressed against a surface, the arm of force-transfer element 68B in contact with tip 26 or collet 66 may move toward PCB 64, and the arm in contact with force-sensing element 78 may move outward or away from PCB 64. In the example of FIG. 16, force $F_{tip}$ (represented by an arrow) is applied to tip 26 so that $0 \leq F_{tip} \leq F_{threshold}$. The threshold force, $F_{threshold}$, represents a force applied to tip 26 necessary to reduce the force on the force sensor, $F_{sensor}$, to approximately zero. In response to the applied force $F_{tip}$, tip 26 is displaced in a direction substantially parallel to longitudinal axis 58 and toward force sensor 62 and PCB 64 by a distance approximately equal to Tip Displacement (TD). Collet 66 is also displaced by approximately TD, which causes the arm of force-transfer element 68B in contact with collet 66 to also be displaced toward force sensor 62 and PCB 64 by approximately TD. Displacement of the arm in contact with collet 66 causes a flexing of neck region 98 and an outward movement of the arm in contact with force-sensing element 78. The outward movement of the arm reduces the force $F_{sensor}$ applied to force sensor 62 at force-sensing element 78 so that $0 \leq F_{sensor} \leq F_{sensor\_MAX}$.

In particular embodiments and as discussed above, as $F_{tip}$ increases, $F_{sensor}$ decreases, and when $F_{tip}$ reaches a value of approximately $F_{threshold}$, then $F_{sensor}$ is approximately zero. When $F_{tip}$ is less than a particular threshold force ($F_{threshold}$), then the force applied to the sensor ($F_{sensor}$) may be referred to as being inversely correlated or negatively correlated with the force applied to tip 26 ($F_{tip}$). In particular embodiments, $F_{sensor}$, the force applied to force sensor 62 by an arm of force-transfer element 68B may be referred to as an inverse transferred force.

In the example of FIG. 17, force $F_{tip}$ is greater than the threshold force $F_{threshold}$, and the force applied to force sensor 62 by force-transfer element 68B is approximately zero. In particular embodiments, when $F_{tip}$ reaches a value of approximately $F_{threshold}$, then an arm of force-transfer element 68B may be just barely in contact with force-sensing element 78. As illustrated in FIG. 17, when $F_{tip}$ exceeds $F_{threshold}$, then neck region 98 may be flexed so that an arm of force-transfer element 68B is moved outward so that it no longer makes contact with force-sensing element 78. In particular embodiments, for any suitable value of $F_{tip}$ that is greater than $F_{threshold}$, the force applied to force sensor 62 by force-transfer element 68B may be approximately zero. In particular embodiments, tip 26, collet 66, or force-transfer element 68B may be configured so that $F_{threshold}$ is approximately 2 newtons, 4 newtons, 6 newtons, or any suitable amount of force.

In particular embodiments, displacement of tip 26 may be limited to a maximum value $TD_{MAX}$ so that $0 \leq TD \leq TD_{MAX}$. As illustrated in the examples of FIGS. 13 and 15-17, force-transfer element 68B may include a hard-stop feature 76C. In particular embodiments, hard-stop feature 76C may be a bump or a raised feature on a surface of force-transfer element 68B that prevents the arm that makes contact with tip 26 or collet 66 from moving beyond a certain amount. In FIG. 17, the force applied to tip 26 is sufficient to make force-transfer element 68B flex so that the arm in contact with collet 66 is also in contact with hard-stop feature 76C. If the force applied to tip 26 is increased, force-transfer element 68B will not flex substantially more because the arm in contact with hard-stop feature 76C is prevented from moving any closer to PCB 64. In particular embodiments, force-transfer element 68B and hard-stop feature 76C may be configured so that the maximum tip displacement, $TD_{MAX}$, may be approximately 0.1 mm, 0.2 mm, 0.5 mm, 1.0 mm, or any suitable displacement value.

In particular embodiments, a force applied to tip 26 may result at least in part from a user holding active stylus 20 and pressing tip 26 against a surface, such as for example a surface of touch-sensitive area 54 of device 52. In particular embodiments, controller 50 may determine an amount of force applied to force sensor 62, and based on that determination, controller may then determine an amount of force applied to tip 26. As an example and not by way of limitation, controller 50 may determine that a force of approximately 5 newtons is being applied to force sensor 62. Based on this determination, controller 50 may determine that there is little or no force being applied to tip 26 (e.g., the force applied to tip 26 is approximately zero newtons) and that tip 26 is not being pressed against a surface with any significant force. As another example and not by way of limitation, controller 50 may determine that a force of approximately 3 newtons is being applied to force sensor 62, and based on this determination, controller 50 may determine that there is a force of approximately 2 newtons being applied to tip 26. As yet another example and not by way of limitation, controller 50 may determine that a force of approximately zero newtons is being applied to force sensor 62. Based on this determination, controller 50 may determine that there is a force of approximately 4 newtons being applied to tip 26 and that tip 26 is being pressed against a surface.

In particular embodiments, in response to a force applied to tip 26, controller may initiate one or more pre-determined functions or gestures executed by active stylus 20 or by device 52. As an example and not by way of limitation, if device 52 has a pen application, the application may display different thicknesses of ink based on the amount of force applied to tip 26. As another example and not by way of limitation, touching tip 26 of active stylus 20 on touch-sensitive area 54 of device 52 may initiate a transfer of data between active stylus 20 and device 52. Moreover, the transfer of data may be initiated in response to the force applied to tip 26 being above a pre-determined trigger level. In particular embodiments, one or more pre-determined functions or gestures may be initiated at one or more pre-determined force levels. As an example and not by way of limitation, initial contact by tip 26 on touch-sensitive area 54 of device 52 may initiate communication of data from active stylus 20 to device 52 corresponding to device settings associated with a particular user. Increasing the amount of force applied to tip 26 above a second level may initiate execution of a particular program by device 52. Although this disclosure describes and illustrates particular functions or gestures initiated by particular forces applied to an active-stylus tip, this disclosure contemplates any suitable functions or gestures initiated by any suitable forces applied to an active-stylus tip.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. An active stylus, comprising:
   one or more computer-readable non-transitory storage media embodying logic for wirelessly communicating with a device through a touch sensor of the device;
   a tip configured to receive an applied force;
   a force sensor configured to receive an inverse transferred force from a force-transfer element; and the force-transfer element, mechanically coupled to the tip and configured to apply the inverse transferred force to the force sensor, wherein the inverse transferred force is inversely correlated with the applied force when the applied force is less than a threshold force, wherein, when the applied force is less than the threshold force, the inverse transferred force decreases monotonically as the applied force increases.

2. The active stylus of claim 1, wherein:
the force-transfer element comprises a strip of material having spring-like properties; and
the force-transfer element is configured to flex outward when the applied force is applied to the tip.

3. The active stylus of claim 1, wherein the force-transfer element comprises a pivot lever configured to flex about a neck region of the pivot lever when the applied force is applied to the tip.

4. The active stylus of claim 1, wherein the force-transfer element is made of brass, copper, aluminum, steel, spring steel, or stainless steel.

5. The active stylus of claim 1, wherein the inverse transferred force applied to the force sensor is approximately zero when the applied force is greater than or approximately equal to the threshold force.

6. The active stylus of claim 1, wherein:
the applied force is directed approximately along a longitudinal axis of the active stylus;
the inverse transferred force is directed approximately orthogonal to the longitudinal axis; and
the force sensor is oriented approximately orthogonal to the longitudinal axis.

7. The active stylus of claim 1, wherein the force sensor is a microelectromechanical systems (MEMS) force sensor.

8. The active stylus of claim 1, wherein the force-transfer element comprises an electrically conductive material that provides at least a portion of an electrical connection between an electrode of the active stylus and the media.

9. The active stylus of claim 8, wherein the electrode is a transmit electrode for wirelessly transmitting signals to the device through the touch sensor of the device.

10. The active stylus of claim 1, wherein the applied force results at least in part from a user holding the active stylus and pressing the tip against the touch sensor of the device.

11. An active stylus, comprising:
first means for receiving an applied force, the first means disposed at or near an end of the active stylus, the active stylus comprising one or more computer-readable non-transitory storage media embodying logic for wirelessly communicating with a device through a touch sensor of the device;
second means for receiving an inverse transferred force from a third means; and
the third means, mechanically coupled to the first means and configured to apply the inverse transferred force to the second means, wherein the inverse transferred force is inversely correlated with the applied force when the applied force is less than a threshold force, wherein, when the applied force is less than the threshold force, the inverse transferred force decreases monotonically as the applied force increases.

12. The active stylus of claim 11, wherein:
the third means comprises a strip of material having spring-like properties; and
the third means is configured to flex outward when the applied force is applied to the first means.

13. The active stylus of claim 11, wherein the third means comprises a pivot lever configured to flex about a neck region of the pivot lever when the applied force is applied to the first means.

14. The active stylus of claim 11, wherein the third means is made of brass, copper, aluminum, steel, spring steel, or stainless steel.

15. The active stylus of claim 11, wherein the inverse transferred force applied to the second means is approximately zero when the applied force is greater than or approximately equal to the threshold force.

16. The active stylus of claim 11, wherein:
the applied force is directed approximately along a longitudinal axis of the active stylus;
the inverse transferred force is directed approximately orthogonal to the longitudinal axis; and
the second means is oriented approximately orthogonal to the longitudinal axis.

17. The active stylus of claim 11, wherein the second means is a microelectromechanical systems (MEMS) force sensor.

18. The active stylus of claim 11, wherein the third means comprises an electrically conductive material that provides at least a portion of an electrical connection between an electrode of the active stylus and the media.

19. The active stylus of claim 18, wherein the electrode is a transmit electrode for wirelessly transmitting signals to the device through the touch sensor of the device.

20. The active stylus of claim 11, wherein the applied force results at least in part from a user holding the active stylus and pressing the first means against the touch sensor of the device.

* * * * *